United States Patent
Fuerle

(10) Patent No.: US 6,718,702 B2
(45) Date of Patent: Apr. 13, 2004

(54) FIRE-RESISTANT BEAMS

(76) Inventor: Richard D. Fuerle, 1711 W. River Rd., Grand Island, NY (US) 14072

(*) Notice: Subject to any disclaimer, the term of this patent is extended or adjusted under 35 U.S.C. 154(b) by 3 days.

(21) Appl. No.: 10/064,272

(22) Filed: Jun. 27, 2002

(65) Prior Publication Data

US 2004/0000118 A1 Jan. 1, 2004

(51) Int. Cl.$^7$ .................................. E04B 1/92
(52) U.S. Cl. ............... 52/168; 52/736.1; 52/737.4; 52/738.1
(58) Field of Search .................. 52/736.3, 737.4, 52/738.1, 168, 721.4, 721.5, 720.1, 721.1, 723.1, 723.2, 729.1, 736.1, 736.2, 737.1

(56) References Cited

U.S. PATENT DOCUMENTS

| | | | | |
|---|---|---|---|---|
| 3,616,583 A | * | 11/1971 | Werneck et al. | |
| 3,773,475 A | * | 11/1973 | Madden, Jr. | 428/558 |
| 4,074,476 A | * | 2/1978 | Ordorika | 52/79 |
| 4,100,970 A | * | 7/1978 | Kreske, Jr. | 169/57 |
| 4,294,165 A | * | 10/1981 | Bergdahl | 98/1 |
| 4,924,639 A | * | 5/1990 | Sato et al. | 52/167 |
| 4,951,441 A | * | 8/1990 | Noji et al. | 52/741 |
| 4,953,330 A | * | 9/1990 | Noji et al. | 52/167 |
| 6,061,992 A | * | 5/2000 | Vincent | 52/721.3 |

OTHER PUBLICATIONS

"Architectural Drafting and Construction," by Ernest R. Weidhaas, Second Edition, Allyn and Bacon, Inc. (1981).

* cited by examiner

*Primary Examiner*—Jeanette Chapman
(74) *Attorney, Agent, or Firm*—Richard D. Fuerle

(57) ABSTRACT

Vertical and horizontal beams in a building are hollow and are filled with at least one container, such as a sack, a ball, or a liner, filled with a heat sink, such as water. In a vertical column, the weight of the containers rests on the foundation and is not carried by the beams. When a fire vaporizes the water inside vertical columns, it is replaced by water falling from higher up in the column.

20 Claims, 8 Drawing Sheets

FIRE-RESISTANT BEAMS

BACKGROUND OF THE INVENTION

This invention relates to a hollow structural beam that is filled with a heat sink. In particular, it relates to hollow rectangular steel beams filled with containers holding water.

The New York World Trade Center (WTC) towers destroyed in the terrorist attack of Sep. 11, 2001 were supported by exterior columns tied to a core of interior columns. Analysis of the collapse of the North and South Towers showed that the buildings withstood the initial impact of the two planes, despite the destruction of many exterior and interior columns. Insulation protecting the columns from heat, however, was blown off and the sprinkler system was destroyed. The jet fuel from the planes ignited, but it is believed that the jet fuel fire dissipated before weakening the columns. Paper, office furniture, carpets, and other combustibles continued to burn, however. When the temperature of the steel exceeded about 2000° F., the columns buckled under the weight of the higher floors and the buildings collapsed.

Ideally, fire protection for steel beams should add little or no additional load to the beams. The fire protection should be in place all the time, so that there is no need to rely upon sprinkler systems for moving water to the fire, as such systems can easily be destroyed in an explosion. And the fire protection should be automatically replenished as it is consumed. These requirements seem impossible to meet, but meeting them is the object of this invention.

SUMMARY OF THE INVENTION

The fire resistant beams of this invention are tubes. The interior of the beams is filled with a material, such as water, that acts as a heat sink.

In a preferred embodiment, vertical beams according to this invention run the entire height of the building and the space inside the beams is continuous from the foundation all the way to the roof. Thus, the entire weight of the heat sink inside the beams rests on the foundation and none of the weight of the heat sink is carried by the beams. When a fire consumes the heat sink at any floor of the building, the entire remaining heat sink all the way to the roof slides down and replaces it.

For example, if the South Tower of the WTC had been protected by vertical beams according to this invention that had an interior space of one square foot, where the beams were filled with water, the fire on the 80$^{th}$ floor of the 110 story building would have had to vaporize at least 360 cubic feet of water (12 feet per floor, 30 higher floors) in each column before the temperature of the steel could even begin to rise above about 212° F. At least 5.5 million Calories would be required to raise the temperature of that amount of water (10 m$^3$) from 20° C. (68° F.) to 100° C. (212° F.), then vaporize it, and there was sufficient fuel to generate only a small fraction of that amount of energy.

DETAILED DESCRIPTION

Figure 1:
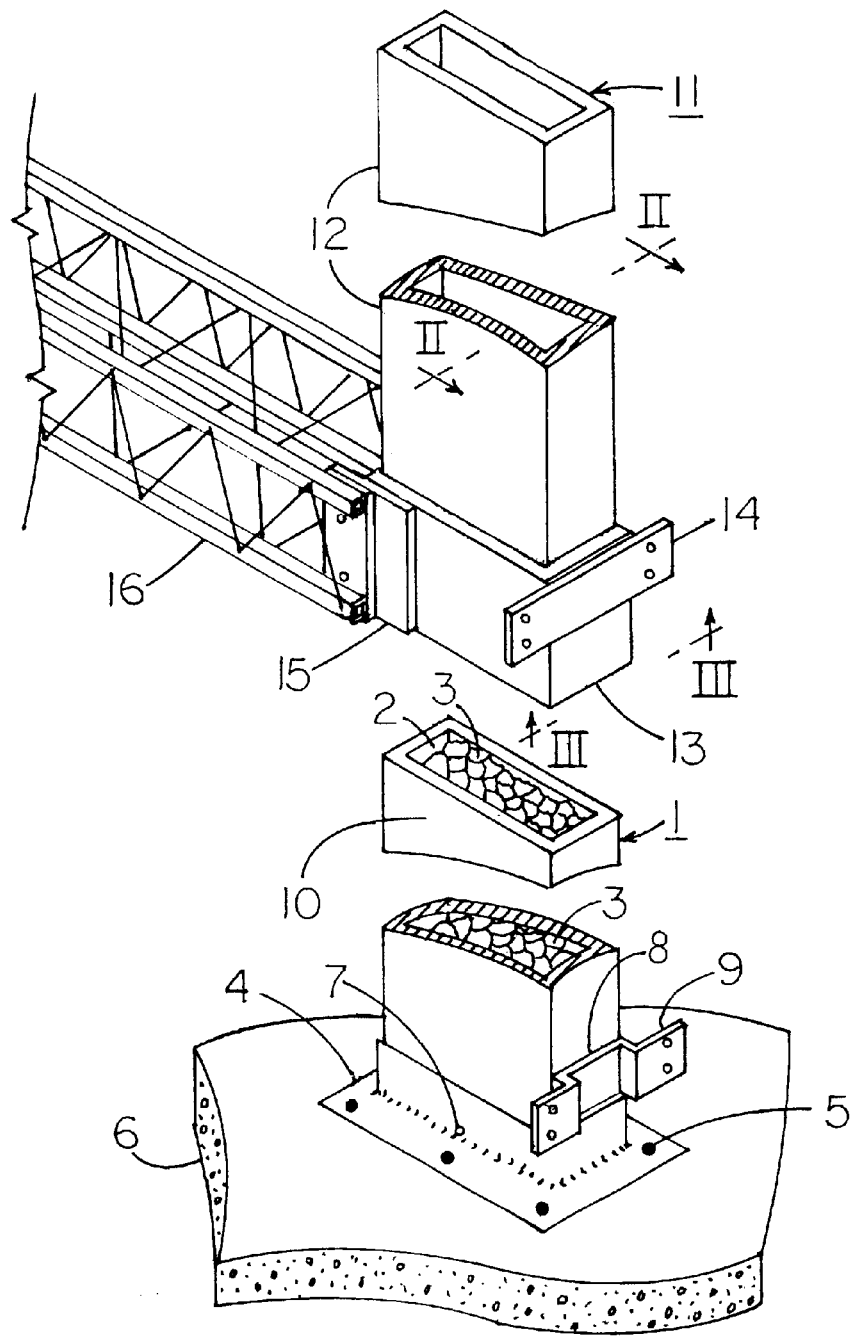
FIG. 1 is an exploded isometric view of a certain presently preferred embodiment of two stacked vertical beams according to this invention.
Figure 2:
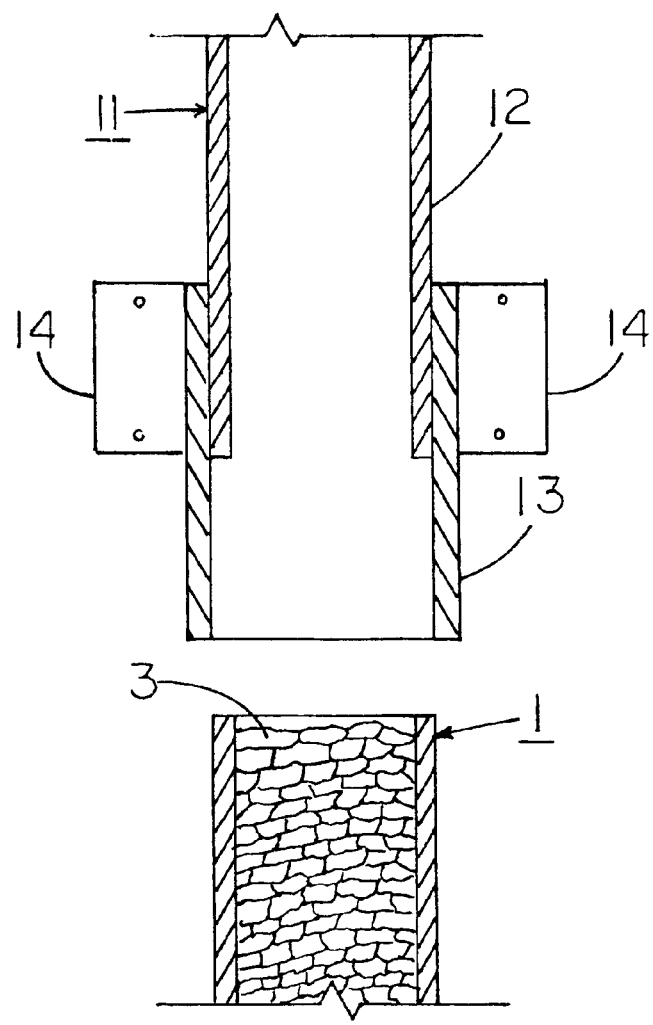
FIG. 2 is a cut away view through 11—11 in FIG. 1.
Figure 3:
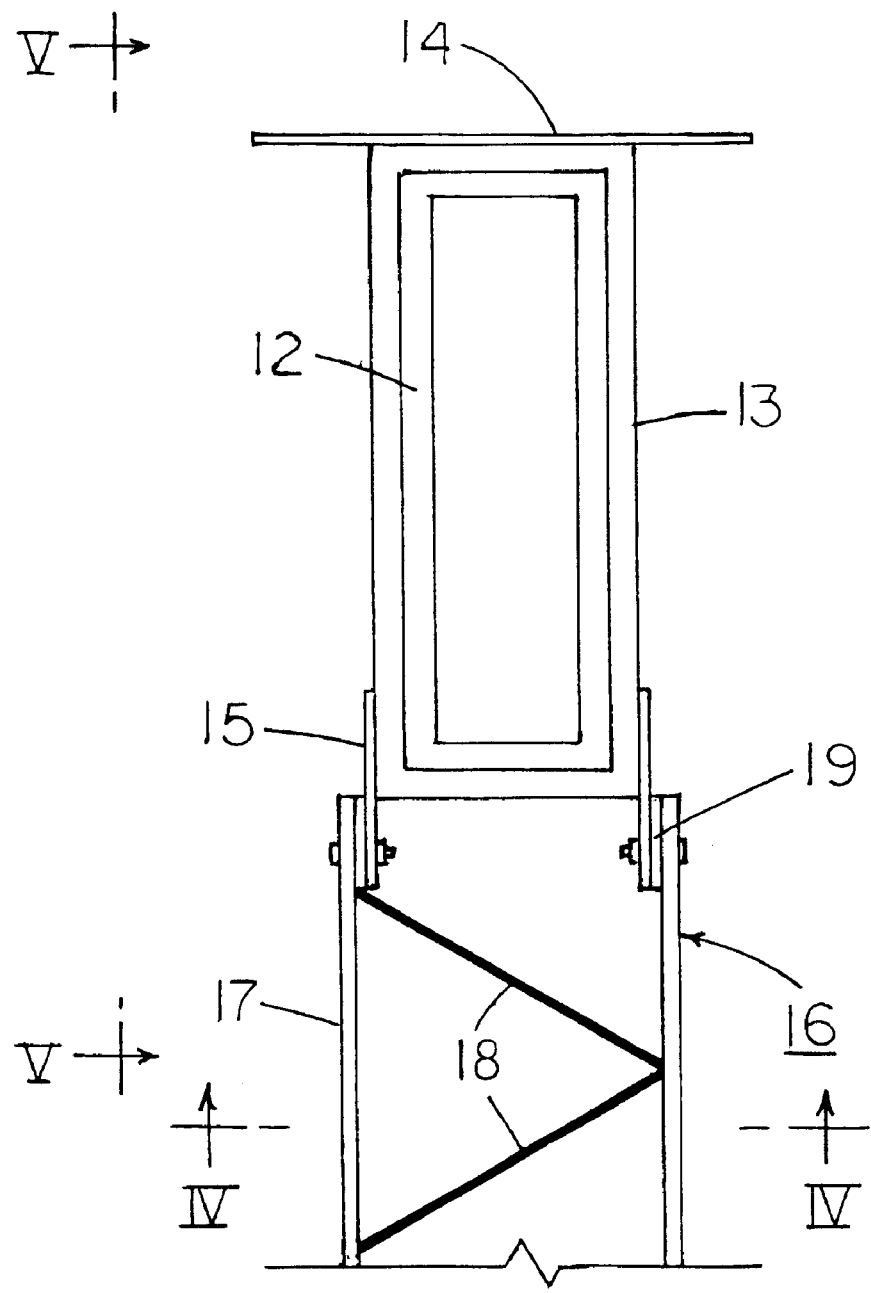
FIG. 3 is an upward-looking plan view through III—III in FIG. 1.
Figure 4:
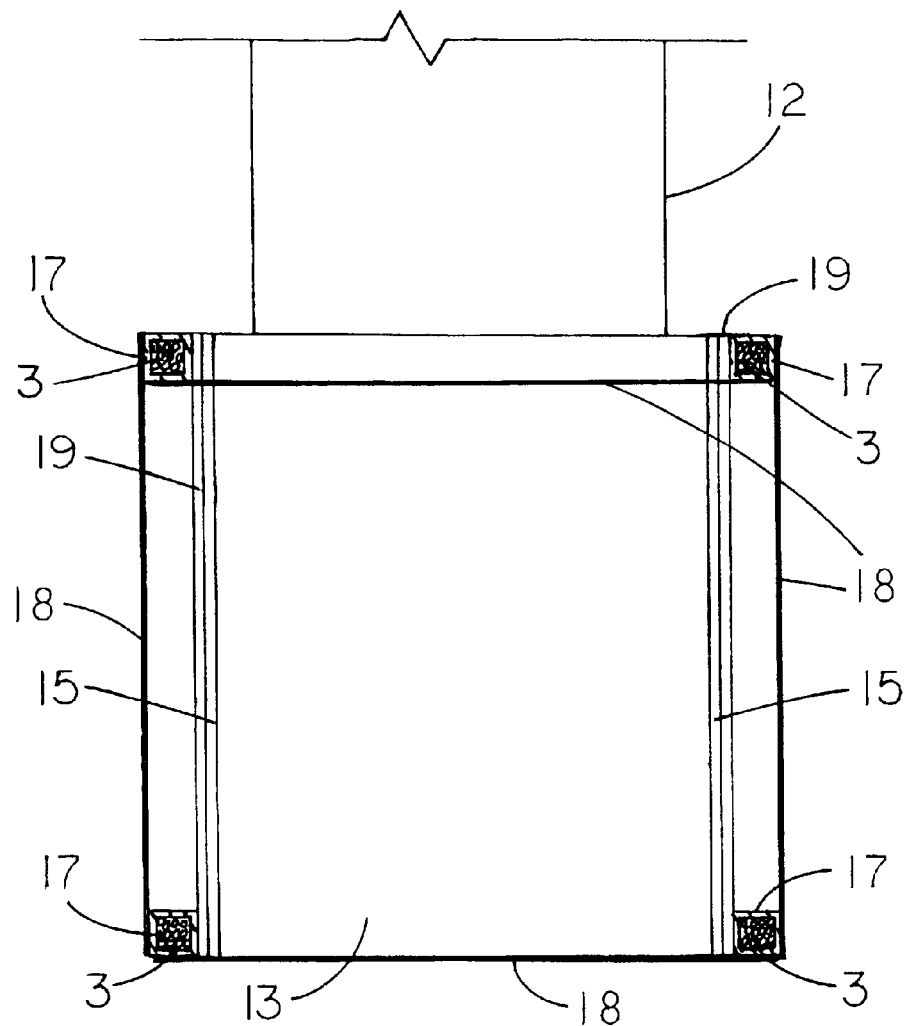
FIG. 4 is an end view through IV—IV in FIG. 3.
Figure 5:
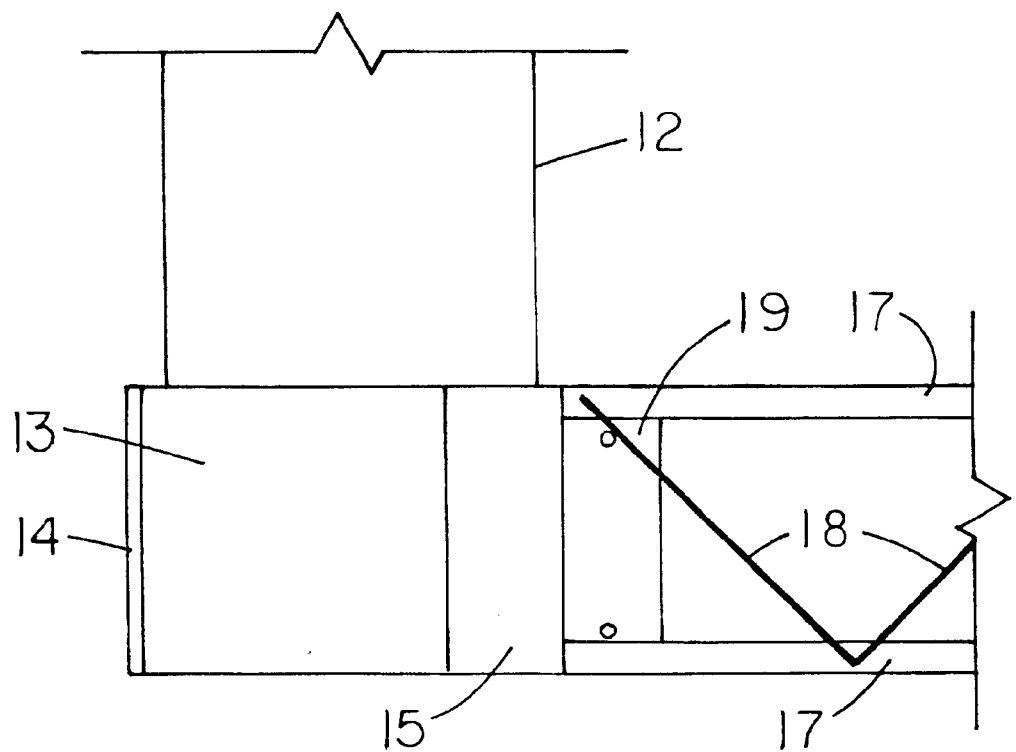
FIG. 5 is a side view through V—V in FIG. 3.

In FIGS. 1, 2, and 3, vertical structural unit 1 encloses space 2 which is filled with a multiplicity of containers 3 which hold a heat sink, such as water. Materials other than water, such as lead balls, could be used as heat sinks, but water is preferred as it is inexpensive, safe, and requires a large amount of heat (540 calories/gram) to vaporize.

Unit 1 has uniform dimensions throughout its entire length. Welded to the base of unit 1 is L-shaped flange 4 through which pass a number of anchor bolts 5 embedded in concrete foundation 6. There is a small drain hole 7 through the base of unit 1 to permit the draining of water should any container 3 break or leak. Also welded to unit 1 is wall flange 8 which faces the outside of a building. Wall flange 8 has wings 9 that are offset by the thickness of unit 1 so that all of the wall flanges are lined up vertically. Because the wider side 10 of unit 1 is perpendicular to the exterior of a building, unit 1 resists buckling outward.

Also shown in FIG. 1 is a second vertical structural unit 11 which has the same dimensions as unit 1 at its upper portion 12, but has a lower portion 13 that has interior dimensions slightly greater than the exterior dimensions of upper portion 12. Lower portion 13 overlaps upper portion 12 somewhat and is welded to upper portion 12. Alternatively, lower portion 13 could simply be an extension of upper portion 12, so that there is no overlap of the sections and welding is avoided. Wall flange 14 is welded to the front of lower portion 13. A floor flange 15 is welded to each side of lower portion 13 and floor joist 16 is bolted to floor flanges 15. (Floor joist 16 would not be attached until unit 11 is in place over unit 1.)

After unit 1 has been bolted to anchor bolts 5, it is filled with containers 3 and unit 11 is lowered over the top of unit 1 so that lower portion 13 slides over the top of unit 1 until upper portion 12 rests on the top of unit 1. Additional units 1 (not shown) can be aligned with unit 1 and bolted to the foundation to form the structure for a side of the building and similar aligned units can form other sides of the building. Alternatively, additional units 1 can be installed so that wider face 10 of the units alternates between being perpendicular to the outside of the building and being parallel to the outside of the building, thereby forming a structural wall that resists buckling in both directions. Additional units 11 (not shown) can be stacked on top of the additional units 1. These units can then be joined together by attaching other structural units (not shown) to wall flanges 8 and 14. The exterior beams can be further joined by bolting joists 16 to floor flanges 15 to support the floors of the building. Other units 11 (not shown) can be stacked onto lower units to add additional floors to the building, filling units at each level with containers 3 as each floor is added. For a tall building, it may be desirable to reduce the dimensions of the units at higher floors, as those units support less weight.

The structural unit that goes onto the top of the column is similar to unit 11 except that at its top it has a wall flange like flange 8 with offset wings and has floor flanges like flanges 15, except that they also have offset wings so that the same joists can be used on every floor. At the top of the top unit is a vent to permit the escape of vapors from the column.

FIGS. 1, 3, 4, and 5 show how joist 16 is attached to floor flanges 15. Joist 16 has four horizontal members 17 between which are welded rods 18, thereby forming vertical triangles on each side and horizontal triangles on the top and bottom of joist 16. Two plates 19 are welded to the ends of members 17 and plates 19 are bolted to flanges 15. Members 17 are filled with smaller containers 3 holding water.

Figure 6:
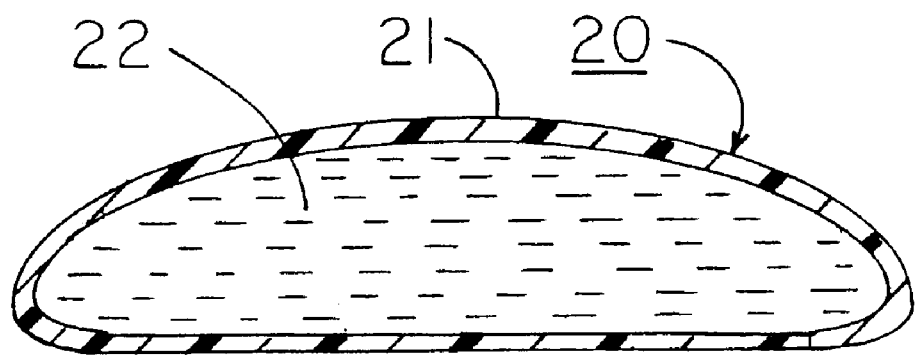
FIG. 6 is a sectional view of a water-filled sack.

Containers 3 can be sacks, balls, liners, or other types of containers. Referring to FIG. 6, sack 20 consists of flexible, waterproof material 21 and water 22 enclosed therewithin. Material 21 can be, for example, rubberized canvas heavy gauge plastic, fire hose material, or other suitable material. Since water is virtually incompressible and a sack is unlikely to break if it cannot be stretched, each sack should be capable of deforming without much stretching so that it leaves no empty space around it as it takes its place in the column. In that way, the weight of sacks above it cannot stretch it by forcing it into empty spaces. Sacks 20 can be dropped into a vertical unit until the unit is filled.

Alternatively, instead of sacks, water-filled balls can be used. Balls, however, leave some empty space in the column and because of the empty space, stress is placed on the balls due to the weight of the balls above them. For that reason, balls are not preferred for vertical units, but may be more useful in horizontal units.

Figure 7:
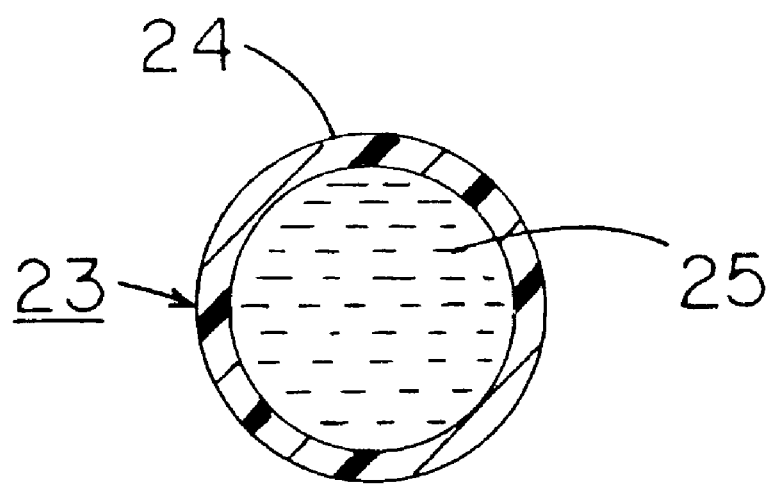
FIG. 7 is a sectional view of a water-containing ball.

Referring to FIG. 7, balls 23 consist of a shell 24 and water 25 therewithin. Balls 23 can have any diameter less than the smaller width of the interior of the unit. Larger balls are preferred as they may have less tendency to get stuck in a vertical unit and may use less shell material to hold a given amount of water. More water can be packed into a given volume by using a mixture of balls of different sizes and stress on the balls can be reduced in that manner.

Preferably, shell 24 is a flexible or rigid plastic. For vertical columns, shell 24 preferably a rigid plastic, such as a polycarbonate, although other materials, such as metals, could also be used. Also, it is preferable for the balls in a vertical column to burst when heated, so that the water inside the balls is sprayed against the interior of the column, which will occur if the balls are rigid. The shells could be, for example, a rigid thermoplastic that melts above 212° F. so that they do not melt until after the water inside them has vaporized and burst them. If the balls do not burst, the water will leak out of shells 24 and may work its way down through the empty spaces in the column without much contact with the walls of the column. On the other hand, elastic shells will deform under the weight of the balls above them, resulting in more water per unit volume. Also, as water is vaporized in the fire zone, the weight on elastic balls below the fire zone will decrease and those balls will resume their spherical shape, pushing additional balls up into the fire zone. It is also preferable for shells 24 to be a material that will vaporize at a temperature below about 1000° F. so as to provide an additional heat sink and also so that material from broken balls does not prevent balls higher in the column from falling into the fire zone.

Shells 24 of balls 23 that are used in a horizontal unit (members 17) are preferably made of a thermoplastic that melts below 200° F. so that the water inside is released by leaking rather than by bursting. Balls in a horizontal unit need not support much weight and their shells do not need to be as strong as the shells used in a vertical column. Horizontal units tend to sag slightly in the middle and the water will therefore accumulate in the middle where it is likely to be most needed. To prepare a horizontal unit, the lower portion of one end of the horizontal unit is sealed, the unit is tilted at an angle so that balls 23 can be rolled down into it from the other end until it is filled, and then the lower portion of that end is sealed to prevent water within from escaping after it has been released. The top of joist 16 can be painted a bright yellow to ensure that it is not installed upside down. Unlike vertical units, the water does add load to a horizontal unit, though the use of balls, which do not fill all the space, would not add as much weight to a unit as sacks that fill all of the space. However, water-filled horizontal units may not be needed as it may be possible to protect the units by other means, such as isolating them with floor and ceiling coverings. Also, fire protection for horizontal units is not as critical because a building is unlikely to collapse if a few horizontal units are destroyed.

Figure 8:
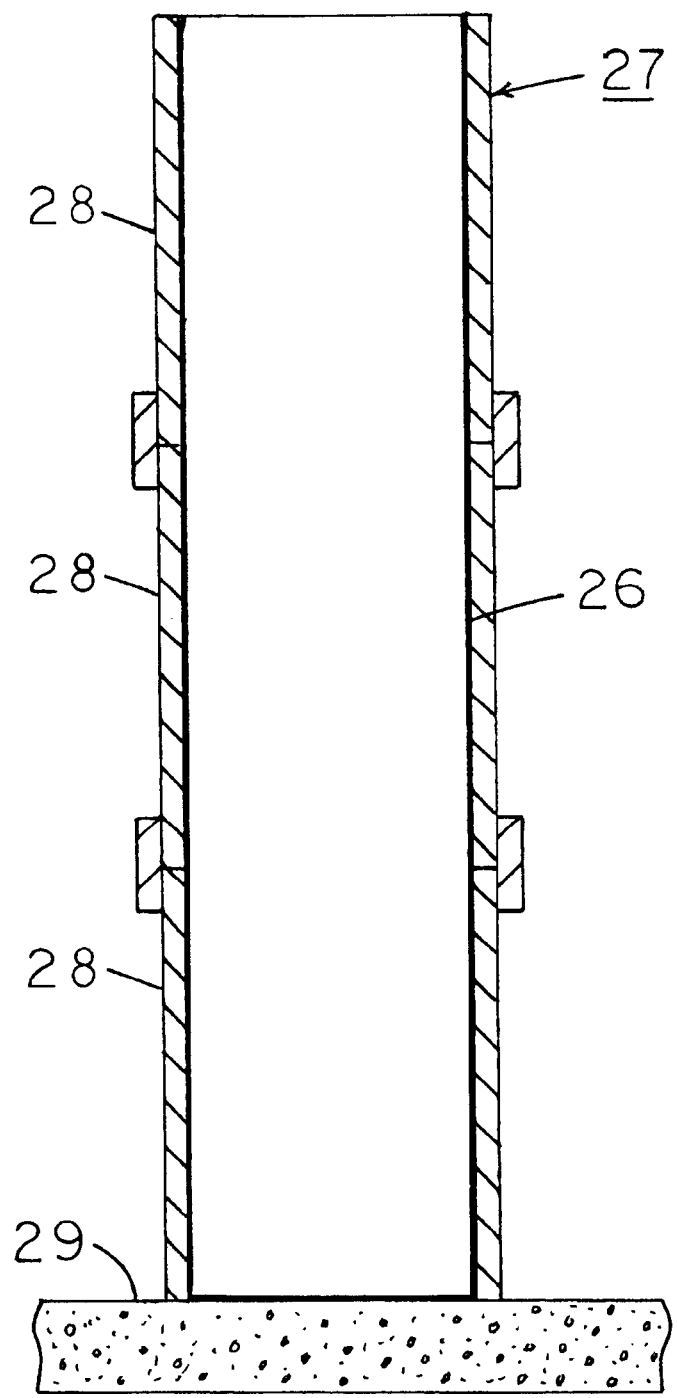
FIG. 8 is a sectional side view of a lined column according to this invention.

While a unit could be internally coated to protect it from corrosion and could be filled with water containing corrosion inhibitors instead of enclosing the water in containers, that is not practical as joints would have to be sealed and any leaks would still eventually corrode the steel. Referring to FIG. 8, a single container 26 can be used for an entire column 27 having numerous units 28 stacked one upon the other on a concrete foundation 29. A rolled up or folded liner of, for example, fire hose material, having the shape of the interior of the column when filled with water and sealed at the bottom is lowered into the column until it reaches the bottom, then is filled with water from the top and sealed.

Alternatively, an empty liner could be placed inside each unit, then filled with water and sealed. But because filled liners on top of it may seal the column, it may be necessary to provide vents to prevent high steam pressures inside the column. Also, such large containers may not slide down the column easily when needed, but if they are made of a material that has a melting point of about 200 to about 350° F., high temperature steam would melt the containers and release the water.

Units 1 and 11 are preferably rectangular (including square) in cross-section as that shape is strong and easy to design into a building, but other cross-sectional shapes, such as a circle or an ellipse, could also be used. The units are preferably made of metal, most preferably steel, but could also be made of other materials, such as fiberglass or graphite fibers. Steel begins to weaken at about 350° F. and loses about half its strength by 1100° F. Therefore, the heat sink preferably undergoes a change of state (i.e., a phase change) that requires a large number of Calories per unit mass (latent heat of fusion or condensation) at a temperature between room temperature and 350° F.

It is now apparent that in this invention a vertical column (stacked units 1, at least one unit 11, and the top unit) does not support the weight of the water. When water is vaporized in the fire zone it is automatically replenished by additional water falling down from higher in the column. All the water from the fire zone to the top of the building must be vaporized before the temperature of the steel at the fire zone can rise above about 212° F. In addition, when the water vaporizes at the fire zone and rises up the column, it cools, condenses, and falls back down the column, repeating that cycle over and over again, each time carrying the heat of the fire away from the fire zone.

What is claimed is:

1. A structural unit comprising
(A) a hollow, vertical, elongated member that encloses a space and is supported by a foundation;
(B) where said space is filled with at least one container, each container enclosing a heat sink, where the weight of said container(s) rests on said foundation and is not carried by said member, at least one container contacts said elongated member, and said container(s) prevents said heat sink from contacting said member; and (C) means for attaching said elongated member to other structural units.

2. A structural unit according to claim 1 wherein said heat sink is water.

3. A structural unit according to claim 1 wherein said elongated member is rectangular in cross section.

4. A structural unit according to claim 1 wherein said elongated member is made of steel.

5. A structural unit according to claim 4 wherein said means are steel flanges welded to said elongated member.

6. A structural unit according to claim 5 wherein a flange is welded to each side of said elongated member and a joist is attached to said flanges, where said joist comprises two upper horizontal members and a lower horizontal member beneath each upper horizontal member, where each upper horizontal member and the lower horizontal member beneath it are connected by rods forming triangles, the two upper horizontal members are connected by rods forming triangles, and the two lower horizontal members are connected by rods forming triangles.

7. A structural unit according to claim 1 wherein said container(s) is a multiplicity of separate containers.

8. A structural unit according to claim 7 wherein said containers are rigid spheres.

9. A structural unit according to claim 8 wherein said rigid spheres are a mixture of different sizes.

10. A structural unit according to claim 7 wherein said containers are flexible, waterproof sacks.

11. A structural unit according to claim 1 wherein said container(s) is a single liner.

12. A structural unit according to claim 11 wherein said single liner is made of fire hose material.

13. A structural unit according to claim 1 wherein at least two said structural units are joined together by at least one hollow, horizontal elongated member, each hollow, horizontal, elongated member enclosing a space within which is at least one container enclosing a heat sink.

14. A structural unit according to claim 1 wherein said elongated member has an upper portion and a lower portion, where the inside dimensions of said lower portion are slightly greater than the outside dimensions of said upper portion so that said structural units can be stacked.

15. A vertical column comprising a stack of structural units according to claim 14 forming a continuous space from the lowest unit to the highest unit.

16. A vertical column according to claim 15 wherein a single container fills said continuous space.

17. A building supported by structural units according to claim 1.

18. A method of erecting a building on a foundation comprising
    (A) attaching hollow, vertical, elongated members that each enclose a space to said foundation
    (B) attaching horizontal beams to said elongated members; and
    (C) filling said spaces with at least one container, each container enclosing a heat sink, where the weight of said container(s) rests on said foundation and is not carried by said elongated members, at least one container contacts said elongated member, and said container(s) prevents said heat sink from contacting said elongated members.

19. A building supported by a multiplicity of structural units attached to a foundation, where each structural unit comprises
    (A) a hollow, vertical, elongated steel member that encloses a continuous space; and
    (B) a single container filled with a liquid heat sink, where said single container fills said continuous space, rests on said foundation, contacts said elongated steel member, and prevents said liquid heat sink from contacting said elongated steel member.

20. A building supported by a multiplicity of vertical columns attached to a foundation, where each column comprises
    (A) at least two hollow stacked steel structural units, each unit enclosing a space, whereby a continuous space runs the length of said column; and
    (B) a single liner filled with water, where said single liner fills said continuous space, rests on said foundation, contacts each hollow stacked steel structural unit, and prevents said water from contacting said steel structural units.

* * * * *